United States Patent
Hanawa

(10) Patent No.: US 12,104,656 B2
(45) Date of Patent: Oct. 1, 2024

(54) CAM CLUTCH

(71) Applicant: TSUBAKIMOTO CHAIN CO., Osaka (JP)

(72) Inventor: Yuto Hanawa, Osaka (JP)

(73) Assignee: TSUBAKIMOTO CHAIN CO., Osaka (JP)

(*) Notice: Subject to any disclaimer, the term of this patent is extended or adjusted under 35 U.S.C. 154(b) by 57 days.

(21) Appl. No.: 17/977,235

(22) Filed: Oct. 31, 2022

(65) Prior Publication Data
US 2023/0140002 A1    May 4, 2023

(30) Foreign Application Priority Data
Nov. 1, 2021 (JP) ................... 2021-178850

(51) Int. Cl.
*F16D 23/12* (2006.01)

(52) U.S. Cl.
CPC ........ *F16D 23/12* (2013.01); *F16D 2023/123* (2013.01)

(58) Field of Classification Search
CPC .......................... F16D 23/12; F16D 2023/123
USPC ............................................... 74/337.5
See application file for complete search history.

(56) References Cited

U.S. PATENT DOCUMENTS

| | | | | |
|---|---|---|---|---|
| 3,175,661 A | * | 3/1965 | Maurer | F16D 41/07 192/113.32 |
| 5,139,123 A | * | 8/1992 | Rutke | F16D 41/07 192/113.1 |
| 5,183,139 A | * | 2/1993 | Malecha | F16D 41/067 192/41 R |
| 5,320,204 A | * | 6/1994 | Riggle | F16D 41/07 192/113.32 |
| 5,664,653 A | * | 9/1997 | Kurita | F16D 41/07 188/82.1 |
| 11,365,771 B2 | * | 6/2022 | Shimanaka | F16D 43/18 |
| 2005/0067248 A1 | | 3/2005 | Takasu | |

FOREIGN PATENT DOCUMENTS

JP    2005-106135 A    4/2005

* cited by examiner

*Primary Examiner* — Ha Dinh Ho
(74) *Attorney, Agent, or Firm* — WHDA, LLP

(57) ABSTRACT

The present invention aims at providing a cam clutch that realizes a reduction in production cost, improves productivity and assemblability, and increases the degree of design freedom. The cam clutch includes: an inner race and an outer race that are coaxial and rotatable relative to each other; a plurality of cams circumferentially arranged between the inner race and the outer race; and positioning members that keep each two adjacent cams at fixed positions relative to each other. The positioning members are configured to link each two adjacent cams such as to be tiltable independently of each other.

3 Claims, 4 Drawing Sheets

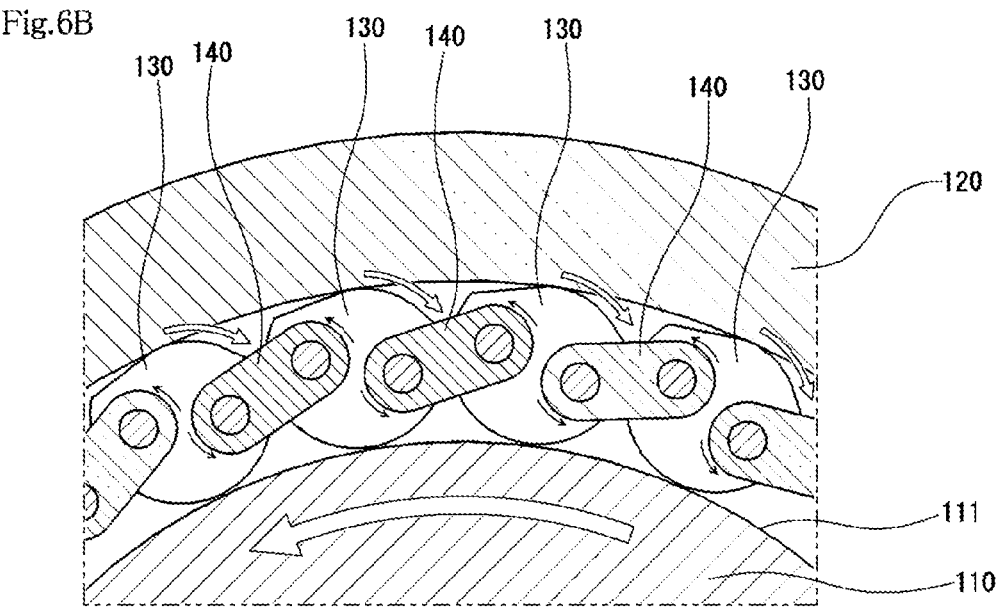

CAM CLUTCH

BACKGROUND OF THE INVENTION

1. Field of the Invention

The present invention relates to a cam clutch that transmits and interrupts torque between an input shaft and an output shaft.

2. Description of the Related Art

A cam clutch is primarily composed of a plurality of cams arranged between an inner race and an outer race, a retainer retaining the plurality of cams, and biasing means biasing each of the cams in a direction in which they wedge against the inner race and outer race.

Japanese Patent Application Publication No. 2005-106135, for example, discloses a one-way clutch that uses a wire cage as a retainer, which is a wire material with axial portions and circumferential portions forming endless zig-zag square U-shaped bends. This retainer retains the cams each set in the space formed by circumferential portions and axial portions in a circumferentially equally spaced manner.

SUMMARY OF THE INVENTION

Cam clutches with a retainer are often required of different characteristics even in the same size. Sometimes, for example, optimally shaped cams are employed, or the number or arrangement of the cams is changed, in accordance with the transmission torque capacity requirements. This in turn necessitates a change in the design of the retainer.

This need to produce purpose-designed retainers in line with the characteristics or size required of the cam clutch was causing issues such as poor versatility of components, and lower productivity and higher production cost due to a difficulty in producing the retainer.

In the case where the retainer is formed as a wire cage, an even number of cams are structurally necessary, i.e., there is a limitation on the number of cams.

The present invention was made based on the circumstances described above and aims at providing a cam clutch that realizes a reduction in production cost, improves productivity and assemblability, and increases the degree of design freedom.

The present invention solves the above problems by providing a cam clutch including: an inner race and an outer race that are coaxial and rotatable relative to each other; a plurality of cams circumferentially arranged between the inner race and the outer race; and positioning members that keep each two adjacent cams at fixed positions relative to each other, the positioning members being configured to link each two adjacent cams such as to be tiltable independently of each other.

The cam clutch according to one aspect of the present application does not have a retainer and instead positioning members link each two adjacent cams and keep the cams in fixed relative positions. Thus the structure is simple and easy-to-produce, which improves productivity and enables reduction of production costs. This structure also provides high versatility since there is no need to make a purpose-designed retainer. Unlike a cam clutch having a retainer made by a wire cage, there is no limitation on the number of cams, so that a high degree of freedom in design is achieved.

According to another aspect of the present application, the cam plates and positioning members can be punched from a plate material and the pin holes can be formed at the same time. The simple punching process for the cam plates and positioning members reduces the workload of machining so that productivity can be improved, as well as production costs can be reduced.

According to another aspect of the present application, a plurality of cam plates are fixed together with two link pins, so that angular alignment of the cams is made easy and the assembling of the cams is facilitated. Moreover, the cams have no redundant (unnecessary) part so that weight reduction can be achieved.

According to another aspect of the present application, the space between cam plates where the positioning members are disposed can be utilized as the mounting part of the annular spring, and there is no need to form a mounting groove for the annular spring during the production process of the cams. In this respect, too, the workload of machining can be reduced and productivity can be improved, as well as production costs can be reduced. The positioning members doubling as a spring receptacle enable application of a correct biasing force from the annular spring on the cams in an engaging direction so that there is no variation in the extent of engagement of each of the cams.

BRIEF DESCRIPTION OF THE DRAWINGS

FIG. 6B is a schematic cross-sectional view illustrating a condition (posture) of the cams in a freewheeling state in the cam clutch shown in FIG. 1.

DESCRIPTION OF THE PREFERRED EMBODIMENT

Figure 1:
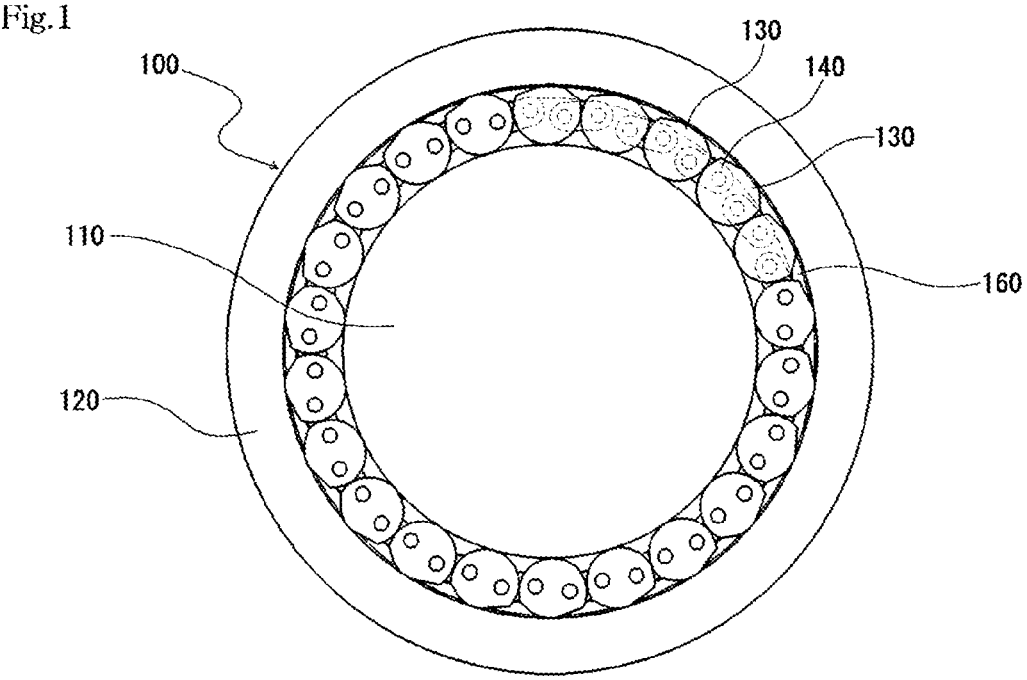
FIG. 1 is a plan view illustrating a configuration of one example of a cam clutch according to the present invention viewed from the direction of the rotation axis.
Figure 2:
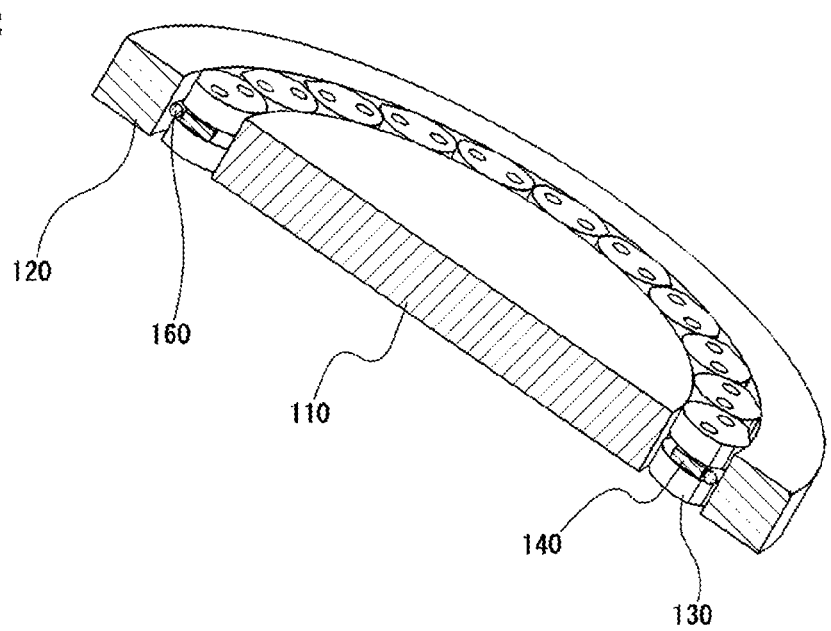
FIG. 2 is a perspective view with a cross section along the rotation axis of the cam clutch shown in FIG. 1.
Figure 3:
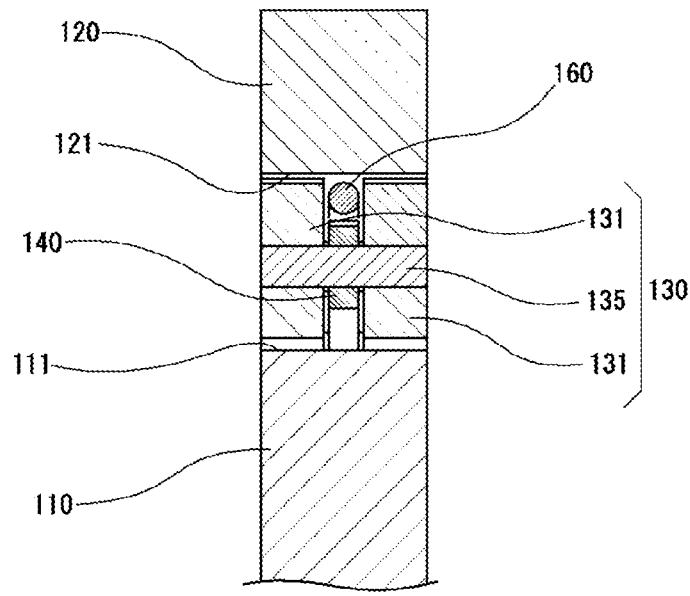
FIG. 3 is a cross-sectional view of an axial section along the rotation axis of the cam clutch shown in FIG. 1.

As shown in FIG. 1 to FIG. 3, the cam clutch 100 according to the embodiment includes: an inner race 110 and an outer race 120 coaxial and rotatable relative to each other; a plurality of circumferentially arranged cams 130 in an annular space between raceways 111 and 121 of the inner race 110 and outer race 120 serving as sprags to transmit and interrupt torque between the inner race 110 and outer race 120; and an annular spring 160 biasing each of the plurality of cams 130 toward a direction in which the cams wedge against the inner race 110 and outer race 120.

Figure 4:
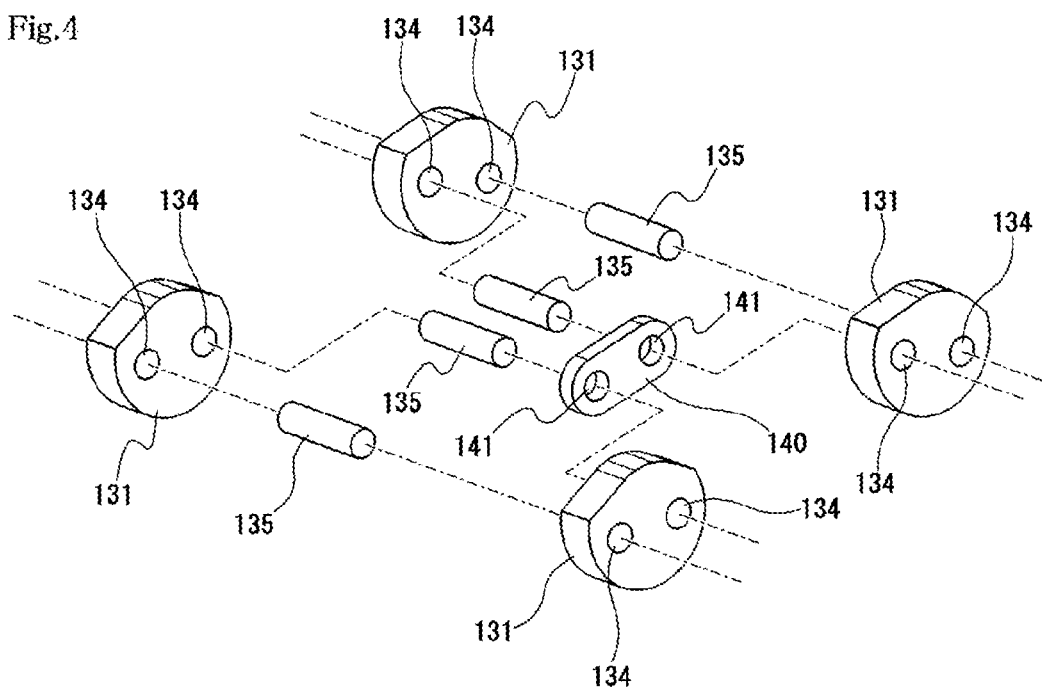
FIG. 4 is an exploded perspective view illustrating the configuration of cams in the cam clutch shown in FIG. 1.

The plurality of cams 130 are each made up of two cam plates 131 arranged in parallel along the direction of an axis around which the cams tilt, and two link pins 135 extending along the direction of the tilt axis at two circumferentially spaced apart locations and connecting the two cam plates 131 together, as also shown in FIG. 4. This design of pairs of cam plates 131 fixed together with two link pins 135 facilitates angular alignment when assembling the cams and improves the assemblability, as well as allows a reduction of material (unnecessary part) of the cams so that a weight reduction can be achieved.

Figure 5:
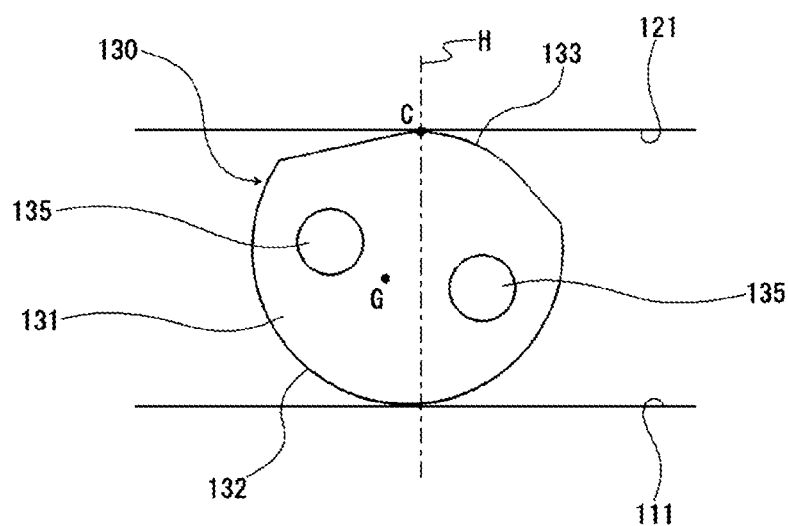
FIG. 5 is a plan view illustrating the configuration of the cam in the cam clutch shown in FIG. 1 viewed from the direction of the tilt axis of the cam.

In this embodiment, the two link pins 135 are positioned such that the center of gravity G of the cam 130 when assembled is located more toward the engaging direction relative to the normal line H at a contact point C between an outer race engaging surface 133 of the cam 130 and the raceway 121 of the outer race 120, as shown in FIG. 5.

While the cam 130 according to this embodiment has two cam plates 131, the number of cam plates 131 is not limited to two and the cam may have three or more cam plates. If the cams are each made up of three cam plates, for example, the spaces made between two adjacent cam plates can be used as mounting portions for annular springs, i.e., two annular springs can be mounted. Two springs can reliably apply a biasing force suitable for a desirable function.

While the cam 130 according to this embodiment is made up of two cam plates 131 connected together by two link pins 135, the cam plates may be connected together by one link pin 135, or by three or more link pins 135.

The cam plates 131 have the same outer contour. There is therefore no variation in the extent of engagement of each of the cams 130, so that frictional loss can be reduced. This also enables improvement of productivity and reduction of production costs.

As shown in FIG. 5, each cam plate 131 has an inner race engaging surface 132 that makes contact with the raceway 111 of the inner race 110, and an outer race engaging surface 133 that makes contact with the raceway 121 of the outer race 120. The inner race engaging surface 132 has a circular arc cross section, for example, and the outer race engaging surface 133 has a curved cross-sectional shape including a circular arc portion with a smaller radius of curvature than the inner race engaging surface 132. For convenience of explanation, FIG. 5 illustrates the raceway 111 of the inner race 110 and the raceway 121 of the outer race 120 as parallel flat surfaces.

Two pin holes 134 extend through the cam plates 131 in the thickness direction. The two cam plates 131 are fixedly joined by link pins 135 press-fit into the pin holes 134.

This configuration can prevent misalignment of the two cam plates 131 from their positions relative to each other (mismatching postures of the cam plates 131), so that the cam plates 131 are unlikely to make engagement in different degrees. The cam plates 131 can be punched from a plate material and the pin holes 134 can be formed at the same time. In this respect, too, the workload of machining can be reduced and productivity can be improved, as well as production costs can be reduced.

This embodiment uses columnar link pins 135, for example, and the pin holes 134 have circular openings with an uniform hole diameter along the thickness direction. The cross-sectional shape of the link pins 135 and the opening shape of the pin holes 134 are not limited to circular. The pins and holes may have any shape as long as they are easy to produce, such as polygonal, elliptical, and oval, for example. Link pins 135 with a polygonal cross section and pin holes 134 with a polygonal opening can reliably provide an anti-rotation function for prohibiting relative rotation of the two cam plates 131. Columnar link pins 135 need not necessarily have a uniform outside diameter along the axial direction and may include parts that vary in outside diameter. The link pins 135 are separate components from the cam plates 131. Optionally, the link pins 135 may be formed integrally with one of the cam plates 131.

Each cam 130 is configured to allow an annular spring 160 to be fitted between the two cam plates 131. Namely, the cam 130 in this embodiment allows a space between cam plates 131 as the mounting part of the annular spring 160, which obviates the need to form a mounting groove for the annular spring during the production process of the cam 130, and therefore the workload of machining can be reduced and productivity can be improved, as well as production costs can be reduced.

In this embodiment, the annular spring 160 is mounted between the two cam plates 131. Alternatively, at least one of the link pins 135 may be provided such as to protrude from an outer end face of the cam plate 131, and the annular spring 160 may be mounted on an outer side in the direction of the tilt axis of the cam plates 131.

Figure 6A:
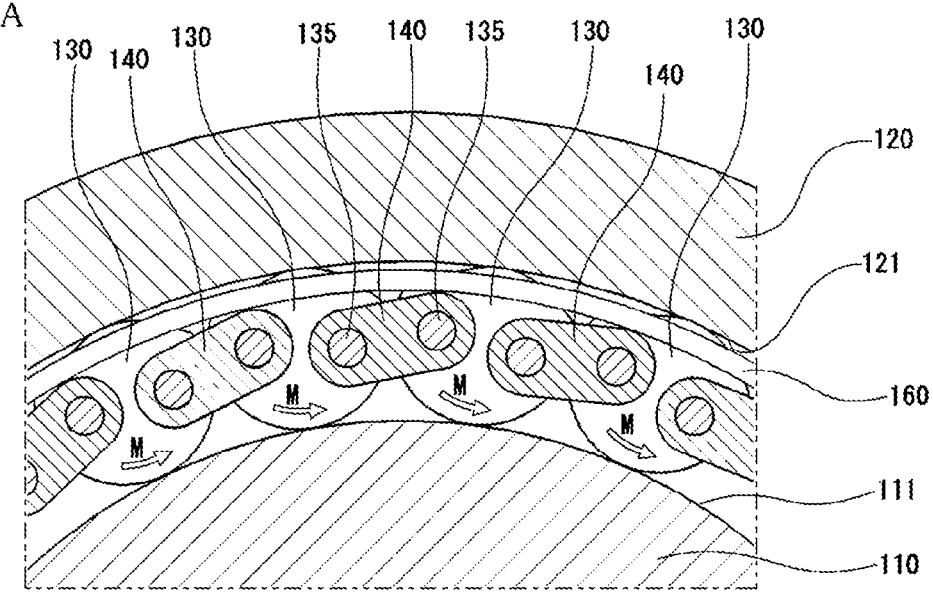
FIG. 6A is a schematic cross-sectional view illustrating a condition (posture) of the cams in a stand-by state in the cam clutch shown in FIG. 1.

The cam clutch 100 in this embodiment uses a ring-like garter spring as one example of the annular spring 160. As shown in FIG. 6A, the garter spring is mounted onto the outer race engaging surfaces 133 of the cams 130 and biases each of the plurality of cams 130 radially inward, imparting a rotational moment M in the engaging direction. The garter spring thus binding the plurality of cams 130 stably retains each cam 130 without variation in their posture (tilt).

While the annular spring 160 is mounted such as to bias each of the plurality of cams 130 radially inward in this embodiment, the cam clutch may be configured such that the plurality of cams 130 are each biased radially outward by the annular spring 160. The annular spring 160 is not limited to a garter spring and may be any spring as long as it biases each of the plurality of cams 130 in a direction in which the cams wedge against the inner race 110 and outer race 120.

The cam clutch 100 described above includes positioning members 140 that keep each two adjacent cams 130 in fixed relative positions, i.e., this configuration does not include a retainer such as a cage ring for retaining the cams 130.

The positioning members 140 are configured to link each two adjacent cams 130 such as to be tiltable independently of each other.

The positioning members 140 in this embodiment are a plate-like member that is oval in plan view and provided with two pin holes 141 at locations spaced away along the longitudinal direction. The link pins 135 of each two adjacent cams 130 are each loosely fitted into the pin holes 141 so that the cam plates 131 can tilt relative to the link pins 135. The cams 130 can therefore move without being obstructed. Thus each two adjacent cams 130 are linked such as to be independently tiltable and kept in fixed relative positions.

This configuration realizes a simple and easy-to-produce structure to improve productivity and reduce production costs, as well as provides high versatility because there is no need to make a purpose-designed retainer. Unlike a cam clutch having a retainer made by a wire cage, there is no limitation on the number of cams, so that a high degree of freedom in design is achieved. While an even number, e.g., twenty two, cams 130 are provided in this embodiment, the number of cams 130 can be an odd number, and can be changed as required in accordance with the purpose.

The positioning members 140 are disposed between the pairs of cam plates 131 within the outer peripheral edges of the cam plates 131 so as not to touch the inner race 110 and outer race 120, and configured to make contact with the annular spring 160 and to receive a biasing force from the annular spring 160. The positioning members 140 doubling as a spring receptacle enable application of a correct biasing force from the annular spring 160 on the cams 130 in an engaging direction so that there is no variation in the extent of engagement of each of the cams 130.

In the cam clutch 100 described above, as shown in FIG. 6A, the annular spring 160 imparts a rotational moment M so that the inner race engaging surfaces 132 of the cams 130 are in contact with the raceway 111 of the inner race 110 and the outer race engaging surfaces 133 of the cams 130 are in contact with the raceway 121 of the outer race 120. That is, all the cams 130 are kept standby so that they can start wedging against the inner race 110 and outer race 120 immediately upon torque input to the inner race 110 or the outer race 120.

For example, when the inner race 110 is rotated in one direction (clockwise in FIG. 6A), the inner race engaging surfaces 132 of the cams 130 make frictional engagement with the raceway 111 of the inner race 110, and the outer race engaging surface 133 of the cams 130 make frictional engagement with the raceway 121 of the outer race 120 so that torque is transmitted between the inner race 110 and the outer race 120.

On the other hand, when the inner race 110 is rotated in the other direction (counterclockwise in FIG. 6B), the cams 130 tilt against the rotational moment M of the biasing force from the annular spring (not shown in FIG. 6B) by a predetermined centrifugal force, i.e., the centrifugal force lifts up the cams 130 from the inner race 110. As the inner race engaging surfaces 132 of the cams 130 separate from the raceway 111 of the inner race 110, the inner race 110 freewheels, i.e., the torque transmission between the inner race 110 and the outer race 120 is interrupted. Wear on the inner race engaging surfaces 132 and outer race engaging surfaces 133 of the cams 130 during high-speed freewheeling can thus be prevented.

The positioning members 140 rotate as the cams 130 tilt, since the link pins 135 of each two adjacent cams 130 are each loosely fitted into the pin holes 141. The positioning members 140 can therefore move smoothly without obstructing the movement of the cams 130 so that a high responsiveness is achieved.

While one embodiment of the present invention has been described in detail, the present invention is not limited to the embodiment described above and may be carried out with various design changes without departing from the scope of the present invention set forth in the claims.

For example, while each two adjacent cams are connected together by plate-like positioning members in the embodiment described above, the means for keeping each two adjacent cams at fixed relative positions are not limited to plate-like positioning members and may take any form as long as they are capable of linking each two adjacent cams such that the cams can tilt independently.

Instead of the link pins that connect two cam plates fixedly together being inserted in the pin holes of the positioning members, cylindrical bushings may be press-fit into the pin holes of the positioning members and the link pins may be loosely fitted in the bushings.

Two positioning members may be mounted to each link pin.

Instead of the positioning members mounted between two cam plates as in the embodiment described above, at least one of the link pins may be provided such as to protrude from an outer end face of the cam plate, and the positioning members may be mounted on an outer side in the direction of the tilt axis of the cam plates. In such a configuration, stoppers may be provided to prevent the positioning members from coming off.

While the cam clutch configuration in the embodiment described above includes biasing means that bias the cams toward a direction in which they wedge against the inner race and outer race, the biasing means may be omitted. In this case, the center of gravity of the cams may be changed as required to cause the cams to make frictional engagement with the inner race and outer race by a centrifugal force.

One example has been described above in which the present invention is applied to a one-way cam clutch. The invention is also applicable to a two-way cam clutch having two kinds of cams configured to receive a rotational moment in different directions, for example, or to a cam clutch having an operation mode switching mechanism for forcibly switching the operation modes of the cam clutch.

What is claimed is:

1. A cam clutch comprising:
an inner race and an outer race that are coaxial and rotatable relative to each other;
a plurality of cams circumferentially arranged between the inner race and the outer race; and
positioning members that keep each two adjacent cams at fixed positions relative to each other,
the positioning members being configured to link each two adjacent cams to be tiltable independently of each other,
wherein the cams each include a plurality of cam plates having an identical outer contour and arranged in parallel along a direction of a tilt axis around which the cams tilt, and a link pin extending along the direction of the tilt axis and connecting the plurality of cam plates together,
the positioning members being loosely fitted on each of the link pins of each two adjacent cams.

2. The cam clutch according to claim 1, wherein the plurality of cam plates are connected together by the link pin at two circumferentially spaced apart locations.

3. The cam clutch according to claim 1, further comprising an annular spring biasing the plurality of cams in a direction in which the cams wedge against the inner race and the outer race,
the positioning members being configured to make contact with the annular spring and to receive a biasing force from the annular spring.

* * * * *